(12) United States Patent
Chungbin et al.

(10) Patent No.: US 10,974,850 B2
(45) Date of Patent: Apr. 13, 2021

(54) SYSTEMS AND METHODS FOR IN SITU MANUFACTURING OF MINIMALLY TOOLED STRINGERS

(71) Applicant: The Boeing Company, Chicago, IL (US)

(72) Inventors: Jerry D. Chungbin, Kenmore, WA (US); Narumi Watanabe, Redmond, WA (US)

(73) Assignee: The Boeing Company, Chicago, IL (US)

( * ) Notice: Subject to any disclaimer, the term of this patent is extended or adjusted under 35 U.S.C. 154(b) by 309 days.

(21) Appl. No.: 15/802,230

(22) Filed: Nov. 2, 2017

(65) Prior Publication Data
US 2019/0127087 A1 May 2, 2019

(51) Int. Cl.
*B64F 5/10* (2017.01)
*B25J 11/00* (2006.01)
(Continued)

(52) U.S. Cl.
CPC .............. *B64F 5/10* (2017.01); *B25J 11/005* (2013.01); *B25J 15/0019* (2013.01);
(Continued)

(58) Field of Classification Search
CPC .. B25J 11/005; B25J 15/0019; B25J 15/0616; B29C 63/046; B29C 63/0073;
(Continued)

(56) References Cited

U.S. PATENT DOCUMENTS 3,501,365 A * 3/1970 Marshall ............... G09F 3/0286
428/42.3
4,527,346 A * 7/1985 Schwartzott ......... A41H 43/005
112/DIG. 2
(Continued)

FOREIGN PATENT DOCUMENTS

DE 10140450 A1 * 3/2003 ......... B29C 63/0065
WO 2014181003 A1 11/2014

OTHER PUBLICATIONS

Machine Translation for DE 10140450 A1 (Year: 2003).*
"European Application Serial No. 18187193.0, Search Report dated Feb. 19, 2019", 8 pgs.

*Primary Examiner* — Christopher J Besler
*Assistant Examiner* — Christine Bersabal
(74) *Attorney, Agent, or Firm* — Kwan & Olynick LLP

(57) ABSTRACT

Provided are systems and apparatuses for manufacturing aircraft support structures. An example robotic end effector comprises a rotatable reel with a flat strip of material wound around the reel. The end effector further includes a forming shoe including a forming surface contacting the strip of material. A first end of the forming surface corresponds to a start shape and a second end of the forming surface corresponds to an end shape. As the strip of material passes from the first end of the forming surface to the second end of the forming surface, the strip of material transitions from the first shape to the end shape and is deposited as a formed stringer ply onto an application surface. The forming shoe may further include a vacuum system to suction air through a plurality of ports along the forming surface to urge the strip of material against the forming surface.

20 Claims, 11 Drawing Sheets

(51) Int. Cl.
*B25J 15/00* (2006.01)
*B25J 15/06* (2006.01)
*B29C 63/04* (2006.01)
*B29C 63/00* (2006.01)
*B29D 99/00* (2010.01)
*B29C 70/38* (2006.01)
*B29L 31/30* (2006.01)
*B29K 63/00* (2006.01)

(52) U.S. Cl.
CPC ....... *B25J 15/0616* (2013.01); *B29C 63/0073* (2013.01); *B29C 63/046* (2013.01); *B29C 70/388* (2013.01); *B29D 99/0003* (2013.01); *B29C 63/0021* (2013.01); *B29C 63/0065* (2013.01); *B29K 2063/00* (2013.01); *B29L 2031/3076* (2013.01); *Y10S 901/40* (2013.01); *Y10S 901/41* (2013.01)

(58) Field of Classification Search
CPC ............ B29C 63/0065; B29C 63/0021; B29C 70/388; B29D 99/0003; B29K 2063/00; B29L 2031/3076; B64F 5/10; Y10S 901/40; Y10S 901/41
See application file for complete search history.

(56) References Cited

U.S. PATENT DOCUMENTS

| | | | | |
|---|---|---|---|---|
| 4,882,007 | A * | 11/1989 | Lengen | B29C 70/545 156/523 |
| 4,915,771 | A | 4/1990 | O'Brien et al. | |
| 7,993,480 | B2 * | 8/2011 | Anderson | B29C 70/38 156/185 |
| 9,789,673 | B2 * | 10/2017 | Brufau Redondo | B29C 70/388 |
| 2009/0130450 | A1 | 5/2009 | Anderson et al. | |
| 2010/0178454 | A1 * | 7/2010 | Brufau Redondo | B29C 53/043 428/119 |
| 2015/0343714 | A1 * | 12/2015 | Weimer | B29C 70/467 264/279 |

* cited by examiner

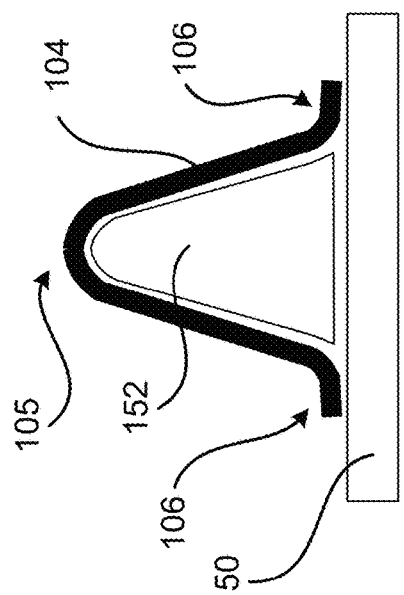
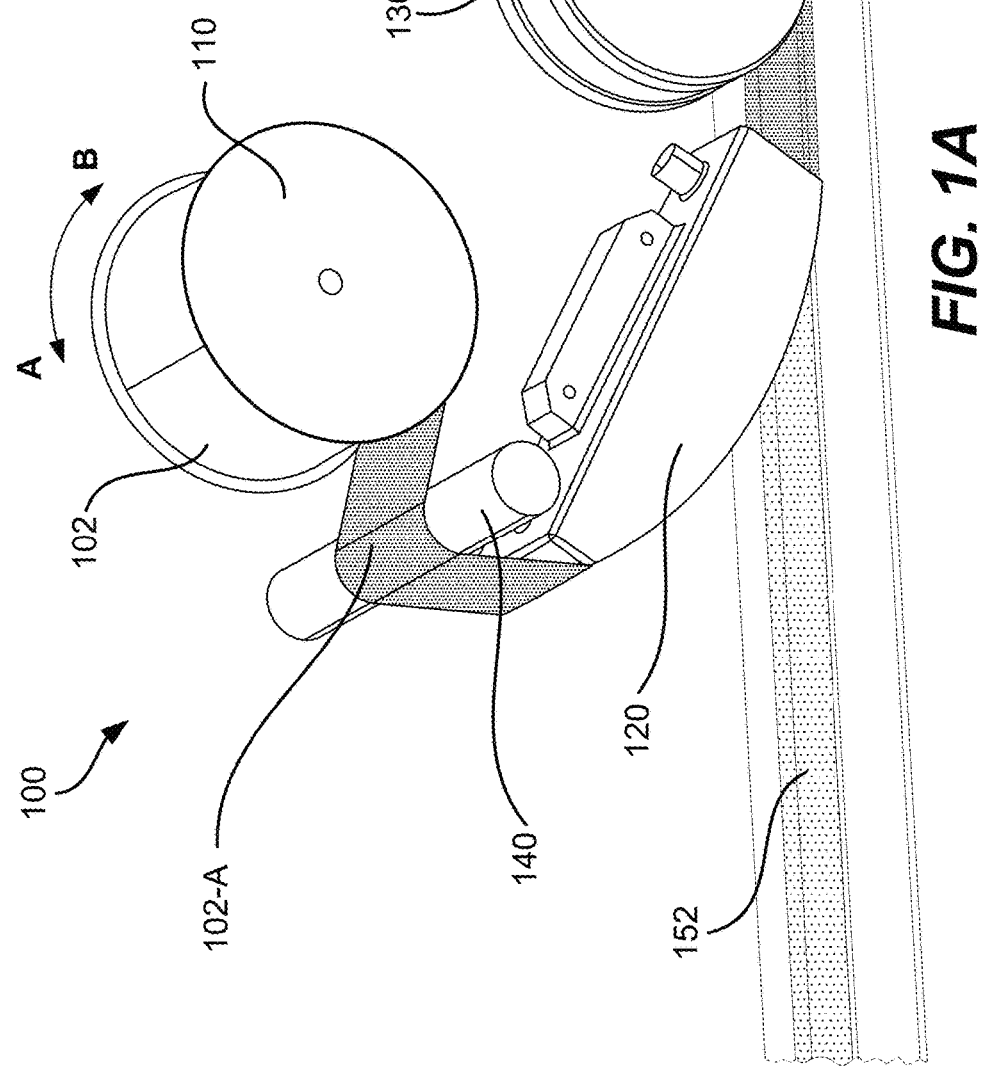
FIG. 1B
FIG. 1A

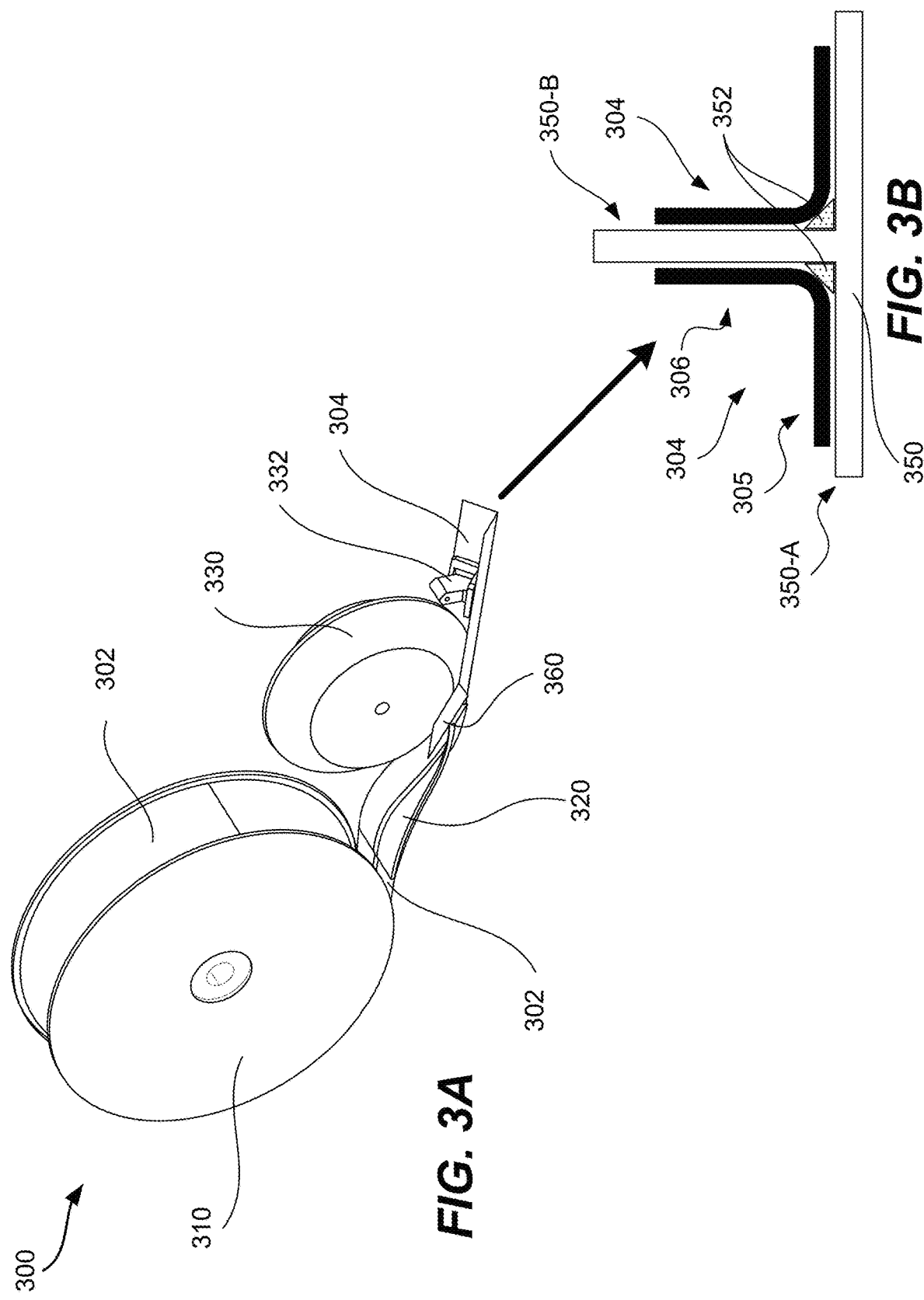

SYSTEMS AND METHODS FOR IN SITU MANUFACTURING OF MINIMALLY TOOLED STRINGERS

TECHNICAL FIELD

The present disclosure relates generally to aircraft support structures and, more specifically, to manufacturing and construction of aircraft stringers.

BACKGROUND

In aircraft and launch vehicle construction, various surfaces, such as the skin of an aircraft, may be attached to structural support members known as stringers, or longerons or stiffeners. In aircraft fuselage, stringers are attached to formers (also called frames) and run in the longitudinal direction of the aircraft. They are primarily responsible for transferring the aerodynamic loads acting on the skin onto the frames and formers. In the wings or horizontal stabilizer, longerons run spanwise and attach between the ribs. The primary function here also is to transfer the bending loads acting on the wings onto the ribs and spar.

Traditional manufacturing of stiffening members on composite parts is very tooling intensive. Given the large size of wings and fuselages, forming and handling equipment for these parts is very expensive, heavy, and require extensive factory floor space, labor, and time.

Thus there is exists a need for improved and automated systems and methods for manufacturing aircraft support structures that reduces the need for labor, extensive tooling, and material handling equipment.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are robotic systems and end effector assemblies for manufacturing and construction of stringers and other aircraft support structures. In some examples, a robotic end effector is provided comprising a rotatable reel with a flat strip of material wound around the reel. The end effector further comprises a forming shoe including a forming surface contacting the strip of material. A first end of the forming surface corresponds to a start shape and a second end of the forming surface corresponds to an end shape.

The strip of material may pass from the first end of the forming surface to the second end of the forming surface such that the strip of material transitions from the start shape to the end shape and is deposited as a formed stringer ply onto an application surface. The end shape may be an "L" shape. The end shape may be a hat-shape.

The forming shoe may further include a set of rails extending from the forming surface to guide the strip of material between the first end and the second end of the forming surface. The forming shoe may further include a vacuum system to suction air through a plurality of ports along the forming surface to urge the strip of material against the forming surface.

The robotic end effector may further comprise a compression mechanism for applying pressure to the formed stringer ply to position the formed stringer ply on the application surface. The compression mechanism may be further configured to join the formed stringer ply to one or more of the following: the application surface and another formed stringer ply. For example, the compression mechanism may comprise a disk including a contact surface for contacting one or more portions of the formed stringer ply. As another example, the compression mechanism may comprise an angled clamping jaw.

The robotic end effector may further comprise a collection spool, wherein the strip of material includes a backing substrate which is separated from the strip of material and wound around the collection spool as the strip of material is passed from the first end to the second end. The backing substrate may include a plurality of perforations. The plurality of perforations may be evenly spaced along the length of the strip of material and used for dispensing the strip of material from the reel.

Other implementations of this disclosure include systems and methods corresponding to the described apparatus. For instance, in another aspect, which may include at least a portion of the subject matter of any of the preceding and/or following examples and aspects, a system is provided which comprises a robotic arm and an end effector as described above.

Also provided is a method of constructing aircraft stiffeners. The method comprises dispensing a strip of composite material from a reel and passing the strip of composite material through a forming shoe. The forming shoe includes a forming surface that contacts the strip of material. A first end of the forming surface may correspond to a start shape and a second end of the forming surface may correspond to an end shape.

The strip of material passes from the first end of the forming shoe to the second end of the forming shoe such that the strip of material transitions from the start shape to the end shape to form a stringer ply.

In some embodiments, the method further comprises urging the formed stringer ply away from the second end of the forming surface and positioning the formed stringer ply relative to an application surface. The method further comprises depositing the formed stringer ply onto the application surface.

These and other embodiments are described further below with reference to the figures.

BRIEF DESCRIPTION OF THE DRAWINGS

FIG. 1A illustrates a perspective view of an example end effector for stiffener manufacturing, in accordance with one or more embodiments.

FIG. 1B illustrates a cross-sectional view of a stringer formed by methods and assemblies described herein.

FIG. 3A illustrates a perspective view of another example of an end effector for an L-shaped stiffener, in accordance with one or more embodiments.

FIG. 3B illustrates a cross-sectional view of an L-shaped stringer formed by methods and assemblies described herein.

DETAILED DESCRIPTION OF PARTICULAR EMBODIMENTS

Figure 1C:
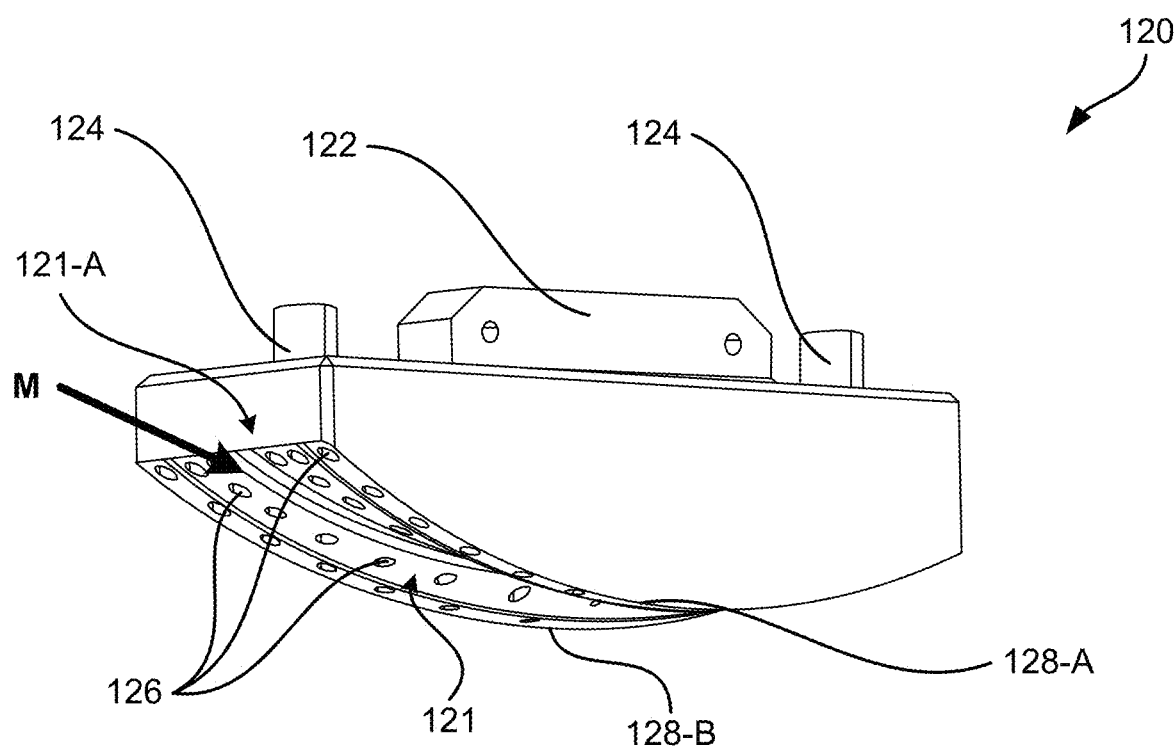
FIGS. 1C and 1D illustrate perspective views of a forming shoe for forming a hat-shaped stringer, in accordance with one or more embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular aircraft structures, such as skin panels. However, it should be noted that the techniques and mechanisms of the present disclosure may apply to various other assembly components of various other vehicle types or building structures. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity. However, it should be noted that some embodiments include multiple iterations of a technique or multiple instantiations of a mechanism unless noted otherwise.

Overview

The present disclosure describes a novel assembly system for construction of various stiffened structural support members, such as stringers, longerons, and other stiffeners, for aircraft and other vehicles or industrial systems. As described herein, the terms "stringers," "longerons," "stiffeners," "support structures," and "support members" may be used interchangeably. Such systems may directly apply lengths of layers or plies formed from composite material onto an application surface to form elongated support structures. Application surfaces may include any higher level assembly component, including portions of various panels, base charges, and/or support tooling. In aircraft, various panels may comprise portions of a skin panel, or structures in horizontal and vertical stabilizers or control surfaces.

The systems may comprise a robotic arm or gantry system with an end effector with various specialized components. The end effector may store the composite material as strips on one or more reels that may dispense the composite material as needed. As the composite material is dispensed it may pass across a forming shoe with a forming surface. The forming surface includes a first end with a corresponding start shape that may be flat or substantially flat. The forming surface also includes a second end with a corresponding net shape. The shape of the forming surface may gradually transition from the start shape to the end shape. The end shape may correspond to the desired formed shape of the stringer or other support structure.

As a strip of composite material passes across the forming surface, it remains in contact with the forming surface. Thus, as it passes across the forming surface, the strip of composite material transitions from a flat or substantially flat shape to the net shape to form a laminate ply of a support structure. The end effector then deposits the formed ply onto the desired location of the application surface.

Additional plies may be formed and deposited upon the previously deposited plies to increase the thickness and build up the support structure.

However, each strip of composite material may include multiple layers that may include the same or different materials and/or properties. Including additional layers in each strip of composite material may optimize the rate of deposit and formation of the support structures such that the end effector may require fewer passes over the application surface. In some embodiments, the end effector may only require one pass over the application surface to create the support structure.

The end effector may further include various other components that function in the construction of the support structure. For example, a vacuum mechanism may be implemented to create suction forces through one or more vacuum ports along the forming surface of the forming shoe such that the strip of composite material is suctioned and urged against the forming surface as it passes across the forming surface.

As another example, various compressions mechanisms may be implemented to urge the formed layer away from the forming shoe and/or towards the application surface to position the formed layer for deposition. Compression mechanisms may include disks, rollers, hydraulic pressure bladders, or spring fingers.

In some embodiments, compound support structures formed by multiple plies may be created using two or more strips of material that are formed and combined before or during deposition onto the application surface. For example, two L-shaped plies may be formed and combined to create a blade-shaped stringer ply that is deposited onto the application surface. In some embodiments, a compression mechanism comprising an angled clamping jaw may be implemented to join the two L-shaped plies together.

In some embodiments, cutting mechanisms may be implemented to separate a deposited ply from the end effector. Support rollers may also be implemented to adjust and optimize the geometry of the composite material as it travels through the end effector. The systems and assemblies described herein may also be used to deposit other structures, including protective caps, as well as base charges.

The systems and assemblies described provide improvements over existing systems of manufacturing structural support members. Traditional manufacturing of stiffening members may be very labor and tooling intensive. For example, a 110 foot stringer for a 777× may require a handing tool weighing over 20,000 pounds to transport it, in addition to multiple sets of tooling and equipment to form, flip, locate, and transport the parts. Thus, existing methods may be very expensive and require vast amounts of floor space and safety equipment.

The disclosed systems and methods combine existing design elements from the textile industry, the film industry, composite manufacturing techniques, and automation resulting in efficiencies not seen in this manufacturing space throughout the aerospace industry. Provided systems provide for automated on-site formation and deposition of formed structural support members that reduce labor and eliminate the need for extensive tooling and material handling equipment.

EXAMPLE EMBODIMENTS

An example of a configuration and components of an end effector are described with reference to FIGS. 1A-1C. FIG. 1A illustrates a perspective view of an example end effector 100 for stiffener manufacturing, in accordance with one or more embodiments. According to various embodiments, end effector 100 comprises a reel 110 with a strip of composite material 102 wound around reel 110. End effector 100 may further comprise components including forming shoe 120, compaction mechanism 130, and support roller 140. These components may be coupled to a robotic assembly at various attachment points. For example, in some embodiments, the components may be coupled to an end effector of a robotic arm or gantry.

The robotic arm may control the position of the end effector 100 to allow composite material 102 to be formed on-the-fly at the application surface site and deposited as a formed stringer ply 104 onto the application surface. In various embodiments, the application surface may be any one of various structures. For example, an application surface may be a higher level assembly structure 150. In some embodiments, higher level assembly structure 150 may be the skin of an aircraft panel. In various embodiments, higher level assembly structure 150 may be other aircraft structure types, such as structures in horizontal and vertical stabilizers or other control surfaces. As another example, at least a portion of the application surface may include a support tool 152 or other structure, such as a base charge. In yet another example, the application surface may be another strip of composite material 102. The application surface may be a combination of one or more of any one of the application surfaces described or another appropriate part.

In various embodiments, composite material 102 is dispensed from reel 110 by rotation of reel 110. As shown in FIG. 1A, reel 110 may rotate in the direction of arrow B to dispense composite material to forming shoe 120. In some embodiments, reel 110 may also rotate in a reverse direction of arrow A. This may allow various functions, such as increasing or maintaining the tension of composite material 102 among components throughout end effector 100. In some embodiments, rotation of reel 110 may be driven by a motor arrangement (not shown), such as a DC motor, servo motor, stepper motor, etc. In some embodiments, one or more motors may be coupled to reel 110 and cause rotation of reel in directions A or B to wind or dispense composite material 102 respectively. In some embodiments, the motor may be coupled to reel 110 via a gear drive or other gear arrangement. In other embodiments, reel 110 may be passive and composite material 102 may be dispensed from reel 110 as a formed stringer ply 104 is secured at one end on the application surface, and the end effector 100 travels in an opposite direction toward an opposite end.

Figure 2A:
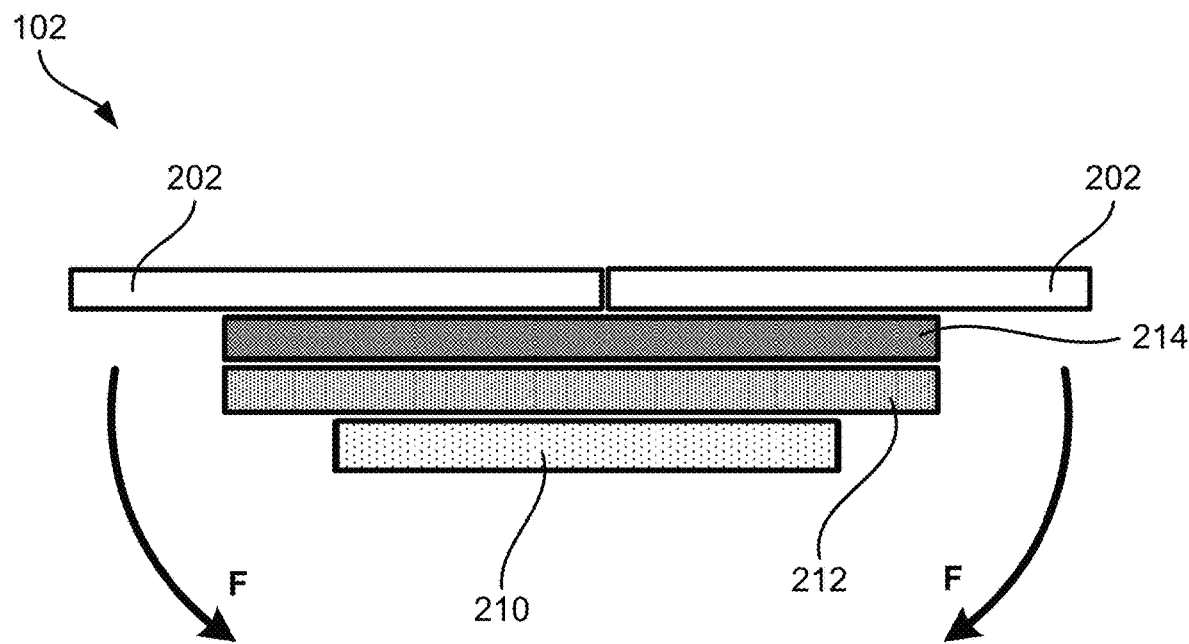
FIGS. 2A and 2B illustrate various layers of composite material that can be used with various embodiments of the present disclosure.
Figure 2B:
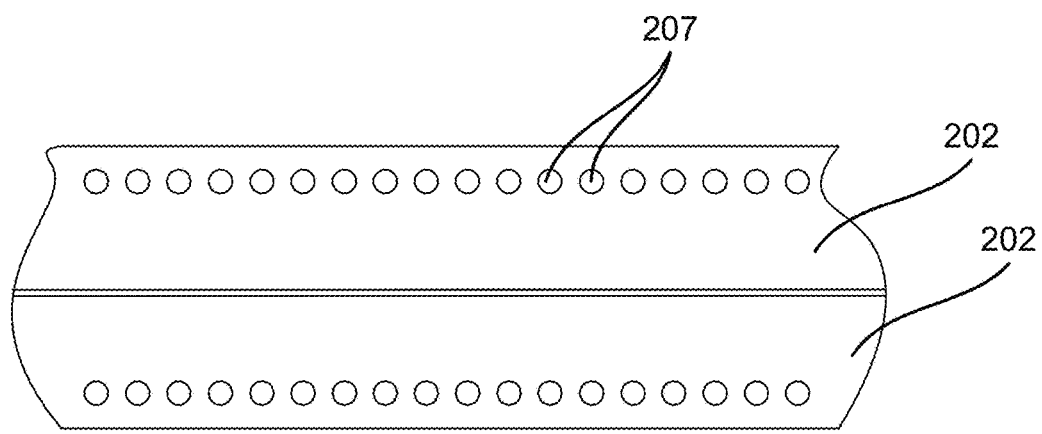

An example of a strip of composite material 102 is depicted in FIGS. 2A and 2B which illustrates the various layers of composite material 102. FIG. 2A illustrates various layers of composite material that can be used with various embodiments of the present disclosure. In various embodiments, composite material 102 may comprise various pre-impregnated composite materials (or "pre-preg"), such as composite fibers pre-impregnated with a thermoset polymer matrix material or resin system, such as epoxy. For example, the resin system (typically epoxy) may already include the proper curing agent. As a result, the pre-preg is ready to lay into a mold or forming surface 121 without the addition of any more resin. In some embodiments, the composite material 102 may be resin infused or thermoformed.

Composite material 102 may include one or more layers of material. As shown, the composite strip 102 may include first layer 210, second layer 212, and third layer 214. In some embodiments, the layers may comprise the same or different materials and configurations. In some embodiments, multiple layers may be included in a strip of composite material 102 to optimize the rate of deposit onto higher level assembly structure 150. For example, including multiple layers in a single composite strip 102 may be included to achieve the desired thickness for each stiffener ply. Including multiple layers may also reduce the need for additional material to be deposited, thereby reducing the possibility of errors during manufacturing. In various embodiments, composite material 102 may comprise more or fewer layers than depicted in FIG. 2A.

In some embodiments, the multiple layers may be combined for various desired mechanical properties. For example, adjacent layers may include fibers that are configured perpendicularly to the fibers in the other to increase strength of the total composite material. In some embodiments, the width of each layer may be varied to accommodate various design properties or shapes of a formed stringer ply 104. For example, as shown in FIG. 2A, first layer 210 may include a shorter width relative to second layer 212 and third layer 214. As the strip of composite material is formed into an L-shaped ply, the outer edges may be curved in the direction indicated by the arrows marked "F" to form the L-shape. Thus, as the layers curve to a final L-shaped position, the outer edges of each layer may end up evenly flush with each other.

In some embodiments, composite material 102 is lined with backing substrate 202, which may prevent adhesion of composite material 102 to itself on reel 110. Backing substrate 202 may also function to prevent rolled layers of composite material 102 from adhering to other end effector components. FIG. 2B depicts another perspective view of backing substrate 202. In various embodiments, backing substrate may comprise various materials, such as paper, plastic, film, cloth, etc. Thus, backing substrate 202 may not be required for resin infused materials 102.

In some embodiments, backing substrate 202 may be split to facilitate removal of backing substrate 202 from composite material 102 as it is dispensed. For example, backing substrate 202 may be split into two backing surfaces which may be peeled and removed on opposite sides of composite strip 102. In some embodiments, backing substrate 202 may be wound around one or more collection spools as it is removed from composite material 102. For example, as depicted in FIG. 1A, composite material 102 on reel 110 may include backing substrate 202. As it is dispensed, the backing film is removed and an exposed composite material 102-A engages support roller 140 and forming shoe 120 to be deposited.

In some embodiments, backing substrate 202 may be removed from composite material 102 at other locations in the end effector. For example, in some embodiments, backing substrate 202 may be separated from composite material 102 as it passes across the forming surface of forming shoe 120. As another example, backing substrate 202 may be separated from composite material 102 after it has passed across the forming surface of forming shoe 120 before it is deposited onto the application surface.

In some embodiments, backing substrate 202 may include a plurality of perforations 207 evenly spaced along the length of the strip of composite material 102. In some embodiments, the perforations 207 may be located along each edge of composite material 102, similar to camera film. In various embodiments, the perforations may comprise various shapes, such as circular or square. In some embodiments, the perforations may be used to control the strip of composite material 102 on reel 110. For example, one or more components of end effector 100, such as reel 110, support roller 140, or the collection spool, may include protrusions that form a sprocket structure. Such protrusions may be shaped and arranged such that the protrusions align with the perforations to grip the backing substrate 202 to move it in a particular direction, such as indicated by arrows A or B.

In some embodiments, the perforations 207 may be used to index the composite strip 102 for realignment of the strip along components of the end effector. The perforations 207 may also allow end effector to track the amount of material dispensed or deposited onto assembly component 150. The rate of composite material movement may also be tracked using perforations 207. A vision system may be used to track the number of perforations that have traveled across a particular point of end effector 100.

In various embodiments, exposed composite strip 102-A may be fed along the forming surface of forming shoe 120 such that exposed composite material 102-A transforms from a flat start shape to a formed stringer with a particular cross-sectional configuration. However, as described above, material 102 may be passed along the surface of forming shoe 120 with backing substrate 202.

Various stringer types formed using end effector 100 may include closed cross-sectional shapes such as hat-shape stringers, or open cross-sectional shapes, such as L-shape stringers. Other formed stringer types may include blade stringers, Z-shape stringers, C-shape stringers, etc. The composite 102 may be formed into various other shapes with open or closed cross-sections. FIG. 1B illustrates a cross-sectional view of a stringer 104 formed by methods and assemblies described herein. As shown in FIG. 1B, formed stringer 104 is a hat-shaped stringer with a central cap portion 105. Sloped surfaces extend from each side of the central cap portion 105 into flange portions 106 that are substantially horizontal.

In some embodiments, depending on the cross-sectional shape of the formed stringer ply 104, a forming shoe may move by an external force to enable compaction and change of shape as each subsequent ply 104 is applied to the application surface.

Figure 1D:
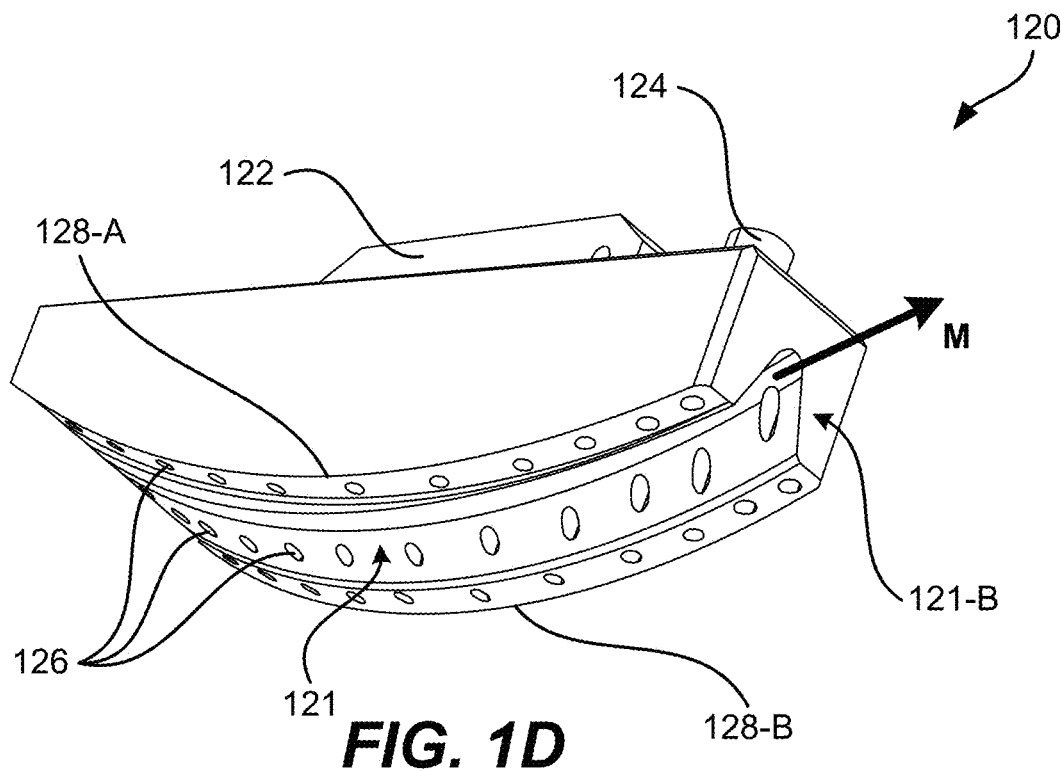

With reference to FIGS. 1C and 1D shown perspective views of a forming shoe 120 for forming a hat-shaped stringer, in accordance with one or more embodiments. In some embodiments, forming shoe may include attachment point 122 which may serve as a surface to couple with a support structure of end effector 100. In various embodiments, a forming shoe, such as forming shoe 120, may include a forming surface 121, which includes a start shape end 121-A and a final shape end 121-B. In various embodiments, the shape of forming surface includes a smooth transition from the configuration of start shape end 121-A to the configuration of final shape end 121-B.

FIG. 1C depicts a perspective view of forming shoe 120 from the start shape end 121-A. As shown, start shape end 121-A, may be flat or near-flat in shape to correspond to the shape of the composite material 102 or 102-A as it is initially dispensed from reel 110. FIG. 1D depicts a perspective view of forming shoe 120 from the final shape end 121-B. As shown, final shape end 121-B corresponds to the shape of formed stringer 102-A shown in FIGS. 1A and 1B. In some embodiments, all or a portion of exposed composite material 102-A remains in contact with the forming surface 121 as it is fed from reel 110. As composite material 102 travels from start shape end 121-A to final shape end 121-B, it may transition from a start shape to an end shape. For example, the composite material 102 may transition from the flat or near-flat shape of start shape end 121-A to the hat-shape of final shape end 121-B and deposited on a higher level assembly structure 150 as the formed stringer ply 104 with the hat-shaped cross-section shown in FIG. 1B.

In various embodiments, composite material 102-A is urged against forming surface 121 such that all or a portion of composite material 102-A remains in contact with forming surface 121. In some embodiments, a plurality of vacuum ports 126 may be included on the forming surface 121 of forming shoe 120. Such vacuum ports 126 may form openings to an interconnected network of channels within forming shoe 120 through which negative pressure may be applied to suction composite material 102-A against forming surface 121. In some embodiments, a vacuum or other suction mechanism may be coupled to forming shoe 120 at vacuum attachments 124 to create the suction force. In some embodiments, the suction mechanism may be coupled to the vacuum attachments 124 via tubes or hoses. In some embodiments, the suction mechanism may be an additional component of end effector 100.

In some embodiments, other mechanisms may be implemented to urge composite material 102-A against forming surface 121. For example, a base structure may include a base surface that is configured with a complementary shape to forming surface 121. Such base structure may be positioned relative to forming shoe such that the base surface and forming surface 121 are aligned such that a composite material 102-A may pass through a space between the base surface and the forming surface 121 such that it is in contact with both the base surface and the forming surface 121. As another example, one or more compression disks may be positioned to contact composite material 102-A and urge it against forming surface 121. Such compression disks may rotate to accommodate the travel direction of composite material 102-A through end effector 100.

In some embodiments, forming shoe 120 may include a set of guide rails comprising rails 128-A and 128-B. Guide rails 128-A and 128-B may be raised structures along the length for forming surface 121. Such rails may function to contact the edges of composite material 102-A ensure that composite material 102-A is centered along forming surface 121 as it travels across the forming surface.

In some embodiments, end effector 100 may include support roller 140 which may be implemented to modify geometry of travel of composite material 102. For example, support roller 140 may be positioned to provide a rotatable curved surface for composite material 102 or 102-A to lie against such that it may curve around the curved surface and change its geometry of travel. This may function to minimize footprint by allowing for more efficient placement or configuration of reel 110, forming shoe 120, compaction mechanism 130, and/or other end effector components. In other embodiments, an end effector 100 may include additional or fewer support rollers as depicted in FIG. 1A.

In some embodiments, the exposed composite material 102-A may be required to be heated to be formed into the final formed shape. In some embodiments, a heating mechanism may be positioned to apply heat to the composite material 102-A. Additionally, and/or alternatively, heat may be applied by one or more other components of end effector 100. For example, the forming shoe 120 may be heated at the forming surface 121 to apply heat to the composite material 102 as it contacts the forming surface 121. In such embodiments, the forming shoe may include a heating element, such as a heating coil. In other embodiments, forming surface 121 may be heated by other means, such as by way of magnetic induction. As another example, a support roller, such as support roller 140, may be heated and transfer such heat to composite material 102-A as it pass across the surface of roller 140.

In some embodiments, formed stringer ply 104 may be deposited over support tool 152 that is placed along the surface of higher level assembly structure 150. In some embodiments, support tool 152 functions to support the shape of formed stringer plies 104 as they set or cure. For example, support tool 152 may be a forming mandrel. Such mandrels may comprise any one of various types of mandrels, such as solid rubber mandrels, expanding rubber mandrels, washout mandrels formed of clay or powder, and flyaway foam mandrels. In other examples, support tool 152 may be an inflatable bladder type. In some embodiments, other support tools may include various radius fillers, such as noodles that may support the shape of formed stringer ply 104 as it is cured. In some embodiments, one or more support tools or radius fillers may be formed as integral structures of the assembly structure 150.

In some embodiments, various compression mechanisms may be implemented to apply pressure on the formed stringer and urge it against assembly structure 150 and/or support tool 152. For example, the compression mechanism may be a compression disk 130 or roller that contacts formed stringer ply 104 as it travels beyond formed shape end 121-B. In some embodiments compression disk 130 may include contact surfaces 131 that contact the upper surface of formed stringer ply 104 at flange portions 106 to urge formed stringer ply 104 away from final shape end 121-B or against the higher assembly structure 150, such that the bottom surface of stringer ply 104 contacts assembly structure 150.

Other compression mechanisms may include an angled clamping jaws, hydraulic pressure bladders, other soft rollers, or spring fingers. In some embodiments, a plurality of compression mechanisms of various types may be implemented in end effector 100. In some embodiments, compression mechanisms may also function to join formed stringer plies 104 to higher assembly structure 150 or to other formed plies.

In some embodiments, the composite material may be cut to separate the deposited ply from the composite material remaining on the end effector. The deposited ply 104 may be cut after contact points with the various compression mechanisms. In other embodiments, the deposited ply 104 may be cut at various other portions of end effector, such as between the forming shoe and a compression mechanism. In some embodiments, the deposited material may be cut to be flush with the higher level assembly component. End effector 100 may include a cutting mechanism.

Thus, the described end effector provides an assembly for streamlined manufacturing of elongated support structures for aircraft. By forming the composite material on-site at the application surface, extensive tooling and material handling equipment is reduced. In various embodiments, the only tooling required is support tooling, such as mandrels, noodles, or bladders for curing. This greatly reduces the factory floor space, labor, and time that are required for transporting and fitting the support structure in place in existing systems for manufacturing structural support members.

With reference to FIG. 3A, shown is a perspective views of another example of an end effector 300 for an L-shaped stringer, in accordance with one or more embodiments. In various embodiments, end effector 300 may be configured to manufacture an L-shaped stringer 304, which may comprise one or more formed plies. As depicted in FIG. 3A, end effector 300 includes reel 310 storing composite material 302, stage one compression mechanism 330, and stage two compression mechanism 332. End effector also includes a forming shoe 320. Forming shoe 320 is simplified for clarity and to indicate the relative positioning of a forming shoe corresponding to end effector 300. In some embodiments, the forming shoe 320 corresponding to end effector 300 may be forming shoe 120, or forming shoes 320-A or 320-B further described with reference to FIGS. 3E and 3F.

As previously described with reference to FIG. 1A, composite material 302 may be dispensed from reel 310 as reel 310 is rotated. Material 302 may then pass across a forming surface of a forming shoe 320 and transition from a flat or substantially flat shape to an L-shaped stringer ply 304. With reference to FIG. 3B, shown is a cross-sectional view of an L-shaped stringer 304 formed by methods and assemblies described herein. L-shaped stringer 304 may include a cross-sectional shape corresponding to the letter "L" and include horizontal leg 305 and vertical leg 306 that are perpendicular or substantially perpendicular to each other.

In some embodiments a backing substrate 360 of composite material 302 may be removed at any one of various instances of the formation of stringer ply 304. As shown in FIG. 3A, backing substrate 360 is removed from material 302 after formation of stringer 304. As previously described, the backing substrate on a strip of composite material may be split and removed as two separate pieces at each side of the formed L-shaped ply. As shown in FIG. 3A, backing substrate 360 is a portion of a split backing substrate, while another portion may be removed on the other side of compression mechanism 330. As shown, backing substrate 360 may be removed at an angle so as not to interfere with adhesion of the formed ply to the higher level assembly structure 350.

In some embodiments, the formed L-shaped stringer 304 may be deposited on a higher level assembly structure 350 that may include one or more support tools 352. As shown, higher level assembly structure 350 may include a horizontal surface 350-A and a vertical surface 350-B. For example, stringer 304 may be deposited such that horizontal leg 305 contacts horizontal surface 350-A of assembly 350 and vertical leg 306 contacts vertical surface 350-B. As previously described, support tool 352 may be any one of various types of support tooling including mandrels, bladders, or noodles. In some embodiments, an additional L-shaped stringer 304 may be deposited on an opposite side of higher level assembly structure 350.

After formation, the formed stringer may then be urged away from the forming shoe by one or more compression mechanisms. In the embodiments described by FIG. 3A, end effector 300 may include a stage one compression mechanism 330 and a stage two compression mechanism 332. In some embodiments, compression mechanisms 330 and 332 may alternatively, and/or additionally, function to apply pressure to formed stringer ply 304 toward the higher level assembly structure 350 for joining. In various embodiments, compression mechanisms 330 and 332 may be any one of compression mechanisms described herein. In some embodiments, compression mechanisms may be articulated or comprise multi-pieces to enable even compaction as additional layers are added causing the support structure to change thickness.

For example, as depicted in FIG. 3A, stage one compression mechanism 330 may comprise a compression disk that may contact at least a portion of the surface of formed stringer ply 304, and stage two compression mechanism 332 may comprise an angled clamping jaw which may contact at least a portion of the surface of formed stringer ply 304. The clamping jaw may comprise a compatible with the formed shape of the ply, an open L-shape in this case. In some embodiments, the compression disk of stage one compression mechanism 330 may apply a lighter force against formed stringer ply 304 to urge it away from the forming shoe or position it toward the assembly structure 350. Then the clamping jaw of stage two compression mechanisms 332 may apply a larger and more pinpointed force against formed stringer ply 304 to join it against one or more surfaces of assembly structure 350.

Figures 3C, 3D:
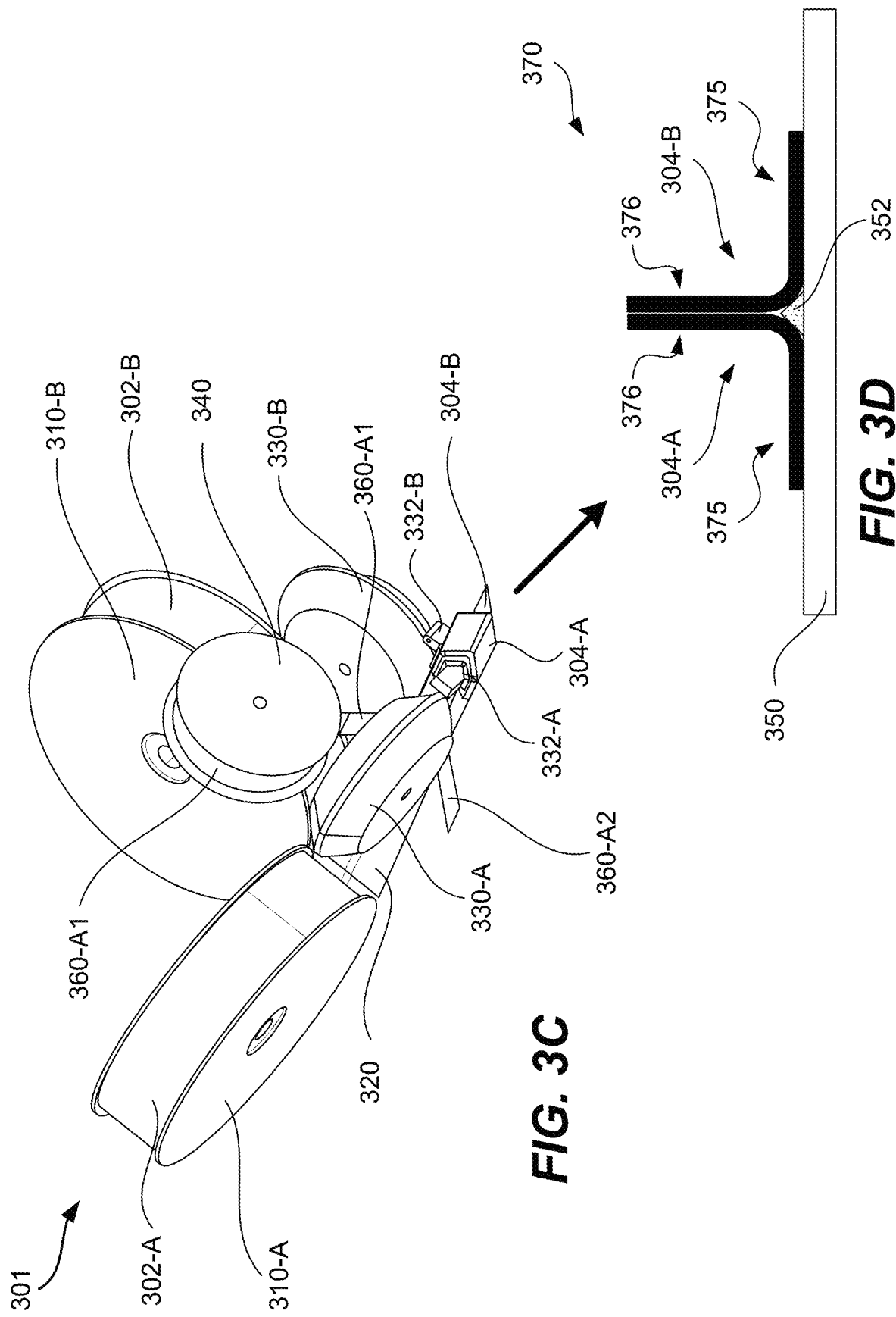
FIG. 3C illustrates a perspective view of another example of an end effector for a blade-shaped stiffener, in accordance with one or more embodiments.
FIG. 3D illustrates a cross-sectional view of a blade-shaped stringer formed by methods and assemblies described herein.

In some embodiments, two L-shaped stringer plies may be compressed against the other to form a blade-shaped stringer. An embodiment of an end effector for forming a blade-shaped stringer 370 is further described below with reference to FIG. 3C. FIG. 3C illustrates a perspective view of another example of an end effector 301 for a blade-shaped stringer 370, in accordance with one or more embodiments. In various embodiments, end effectors may be configured to construct compound support structures by joining multiple formed plies. For example, two L-shaped plies may be formed and combined to create a single blade-shaped stringer ply 370, which is further described with reference to FIG. 3D.

In some embodiments, end effector 301 may comprise two instances of end effector 300 that are perpendicularly positioned at approximately 90 degrees to each other. In other words, end effector 301 may comprise two such identical assemblies that are symmetrically configured. As depicted in FIG. 3C, end effector 301 comprises two reels of composite material including reel 310-A storing strip of composite material 302-A and reel 310-B storing strip of composite material 302-B. In some embodiments, reels 310-A and/or 310-B may be reel 310, and composite strips 302-A and 302-B may be composite strip 302. Each of materials 302-A and 302-B may then be dispensed from the respective reels to a forming shoe, where each composite strip is formed into an L-shaped ply. Composite strip 302-A may be formed into L-shaped ply 304-A and composite strip 302-B may be formed in to L-shaped ply 304-B.

As depicted in FIG. 3C, forming shoe 320 is simplified for clarity and indicates the relative positioning of a first forming shoe corresponding to material 302-A of end effector 301. In some embodiments, the first forming shoe 320 may be forming shoe 320-A or 320-B further described with reference to FIGS. 3E and 3F. A second forming shoe may be situated in a corresponding position to engage material 302-B. In various embodiments, the second forming shoe of end effector 301 may include the same or different configuration as the first forming shoe of end effector 301.

As previously described composite strips 302-A and 302-B may each include a backing substrate to prevent adhesion of the strips to themselves in the reel or to other components in the end effector 301. After formation of the composite strips 302-A and 302-B into L-shaped plies 304-A and 304-B, respectively, backing substrate may be removed from the composites 302-A and 302-B. As shown, material 302-A may include backing substrate that is split into backing 360-A1 and 360-A2, which may be removed after formation on either side of composite strip 302-A. In some embodiments, backing substrate 160-A1 may be wound around a collection spool 340 for collection and later disposal or recycling. Backing 360-A2 may be collected by an additional collection spool (not shown). Material 302-B may also include a split backing substrate hat is collected by respective collection spools. However, in some embodiments, one of the split backings of material 302-B may be collected by collection spool 340 along with backing 360-A1.

As described, formed L-shaped plies 304-A and 304-B may be joined together to form a blade-shaped stringer ply 370. As shown in FIG. 3D illustrates a cross-sectional view of a blade-shaped stringer 370 formed by methods and assemblies described herein. As with stringer ply 304, each L-shape plies 304-A and 304-B may include a cross-sectional shape corresponding to the letter "L" and include horizontal leg 375 and vertical legs 376 that are perpendicular or substantially perpendicular to each other.

L-shaped plies 304-A and 304-B may travel from the forming shoe toward first and second stage compression mechanisms. First stage compression mechanism 330-A and second stage compression 332-A may contact formed ply 304-A, while first stage compression mechanism 330-B and second stage compression mechanism 332-B may contact formed ply 304-B. As shown, first stage compression mechanisms 330-A and 330-B may be compression disks that urge the formed plies away from their respective forming shoes and/or toward the other formed ply.

In some embodiments, second stage compressions mechanisms 332-A and 332-B may comprise an angled clamping jaw. Mechanisms 332-A and 332-B may apply equal and opposite pressure against legs 376 of each formed ply to join the vertical legs 376. Once the vertical legs have adhered, a blade shaped stringer ply 370 is formed. In various embodiments, a clamping jaw mechanism may be implemented to join other compound stringer shapes, further described with reference to FIG. 5. In some embodiments, first stage compression mechanisms 330-A and 330-B may also apply opposite pressure to joint legs 376.

Blade-shaped stringer 370 may then be deposited onto application surface 350 including a support tool 352. In some embodiments, the compression mechanisms may also apply downward pressure to join the horizontal legs 375 of stringer ply 370 to the application surface. In some embodiments, the vertical legs 376 of blade stringer 370 may be sewn or stitched together by a stitching mechanism for additional attachment support. For example, composite material comprising dry fabric may be sewn with fibers. In some embodiments, the stitching mechanism may also be a component of the end effector. In some embodiments, the stitching mechanism may be a separate end effector or apparatus.

Figure 3E:
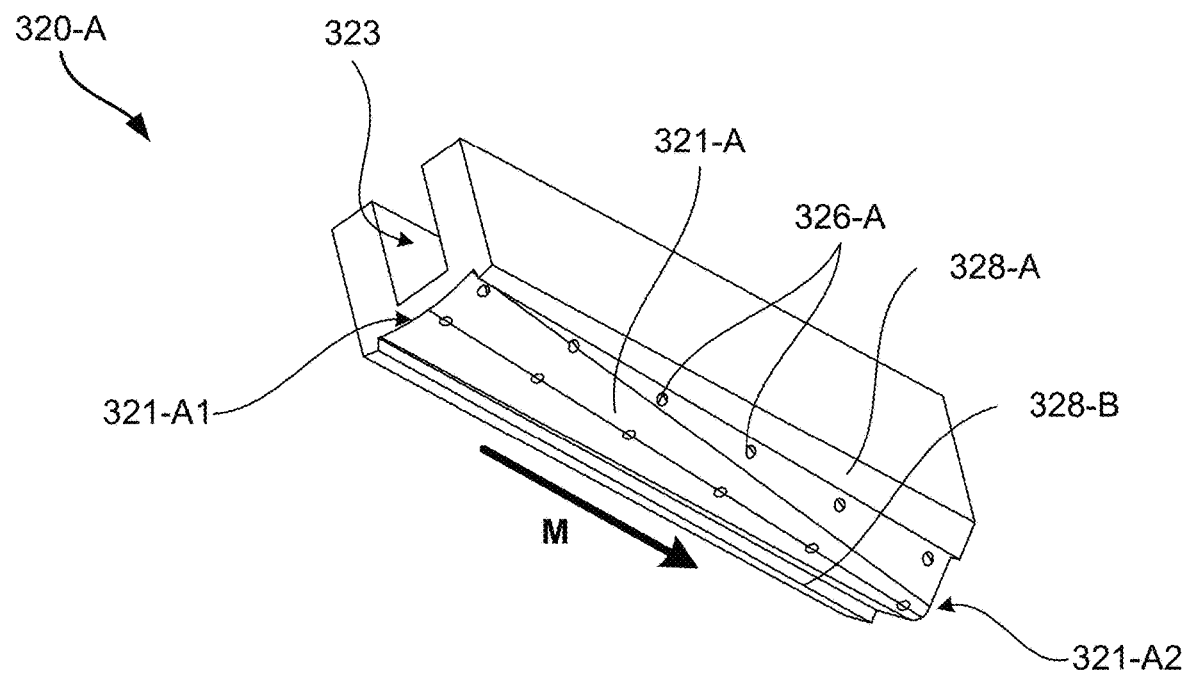
FIGS. 3E and 3F illustrate perspective views of forming shoes for forming L-shaped stringers, in accordance with one or more embodiments.
Figure 3F:
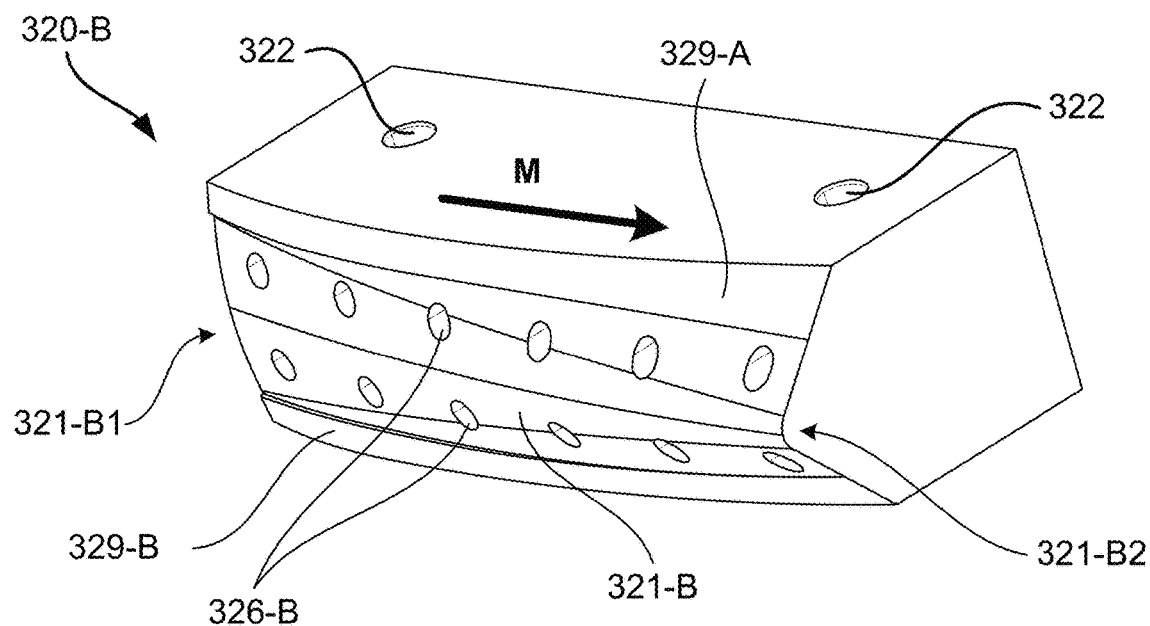

FIGS. 3E and 3F illustrate perspective views of forming shoes for forming L-shaped stringers, in accordance with one or more embodiments. FIG. 3E illustrates a forming shoe 320-A and FIG. 3F illustrates a forming shoe 320-B. In various embodiments, forming shoes 320-A and 320-B may correspond to forming shoe 320 of end effectors 300 and/or 301. Forming shoes 320-A and 320-B may be configured for forming L-shaped stringers, such as stringers 304, 304-A, and/or 304-B.

As shown, forming shoe 320-A may include a forming surface 321-A with a start shape end 321-A1 and a final shape end 321-A2. In some embodiments, start shape end 321-A1 may be flat or near-flat in shape to correspond to the shape of the composite material 302 as it is initially dispensed from reel 310. In some embodiments, final shape end 321-A2 corresponds to the L-shape of formed stringer 302 shown in FIGS. 3A and 3B. As shown, forming shoe 320-B may include a forming surface 321-B with a start shape end 321-B1 and a final shape end 321-B2. In some embodiments, start shape end 321-B1 may be flat or near-flat in shape to correspond to the shape of the composite material 302 as it is initially dispensed from reel 310. In some embodiments, final shape end 321-B2 corresponds to the L-shape of formed stringer 304 shown in FIGS. 3A and 3B.

As composite material is passed across the forming surfaces 321-A or 321-B, it transitions from the shape of start shape end 321-A1 or 321-B1 to the shape of the final shape end 321-A2 or 321-B2, respectively. The M arrow depicted in FIGS. 3E and 3F indicate the direction of travel of the composite material 302.

Forming shoes 320-A or 320-B may be secured to the structure of an end effector, such as 300 or 301 via various attachment points. In some embodiments, forming shoe 320-A may include a mechanism compartment 323 in which a joint or other structure may be mechanically secured. In some embodiments, forming shoe 320-B may include attachment points 322 which may function as provisions into an end effector structure. Forming shoes described herein may be coupled to the end effector via a jointed structure or connection to allow necessary movement and adjustments during operation.

In some embodiments, composite material 302 is urged against forming surface 321-A or 321-B such as to remain in contact with the forming surface 321-A as it is fed from reel 310 and passes across the forming surface. As previously described, various mechanisms may be implemented to keep composite material 302 against the forming surface. As shown in FIGS. 3E and 3F, forming shoes 320-A and 320-B include one or more vacuum ports 326-A and 326-B, respectively. A vacuum or other suction mechanism to create negative pressure through the vacuum ports to suction composite material 302 against the forming surface. In some embodiments, the suction mechanism may be an additional component coupled to the end effector. In some embodiments, such suction mechanism may be located in mechanism compartment 323.

As also previously described, a heating mechanism may also be included in the end effector to heat the composite material for it to be molded into the end shape of the formed stringer. In some embodiments, the heating mechanism may also be located within the mechanism compartment 323.

In various embodiments, forming shoes 320-A or 320-B may further include guide rails to keep the composite material 302 centered as it passes across forming surface 321-A or 321-B, respectively. Forming shoe 320-A includes a set of rails comprising first rail 328-A and second rail 328-B. Forming shoe 320-B includes a set of rails comprising first rail 329-A and second rail 329-B. As previously described, each guide rail may be configured to contact an edge of composite material 302 as it travels across to form a track to prevent lateral movement of the composite material 302 in any other direction than that indicated by arrow M.

Figure 4:
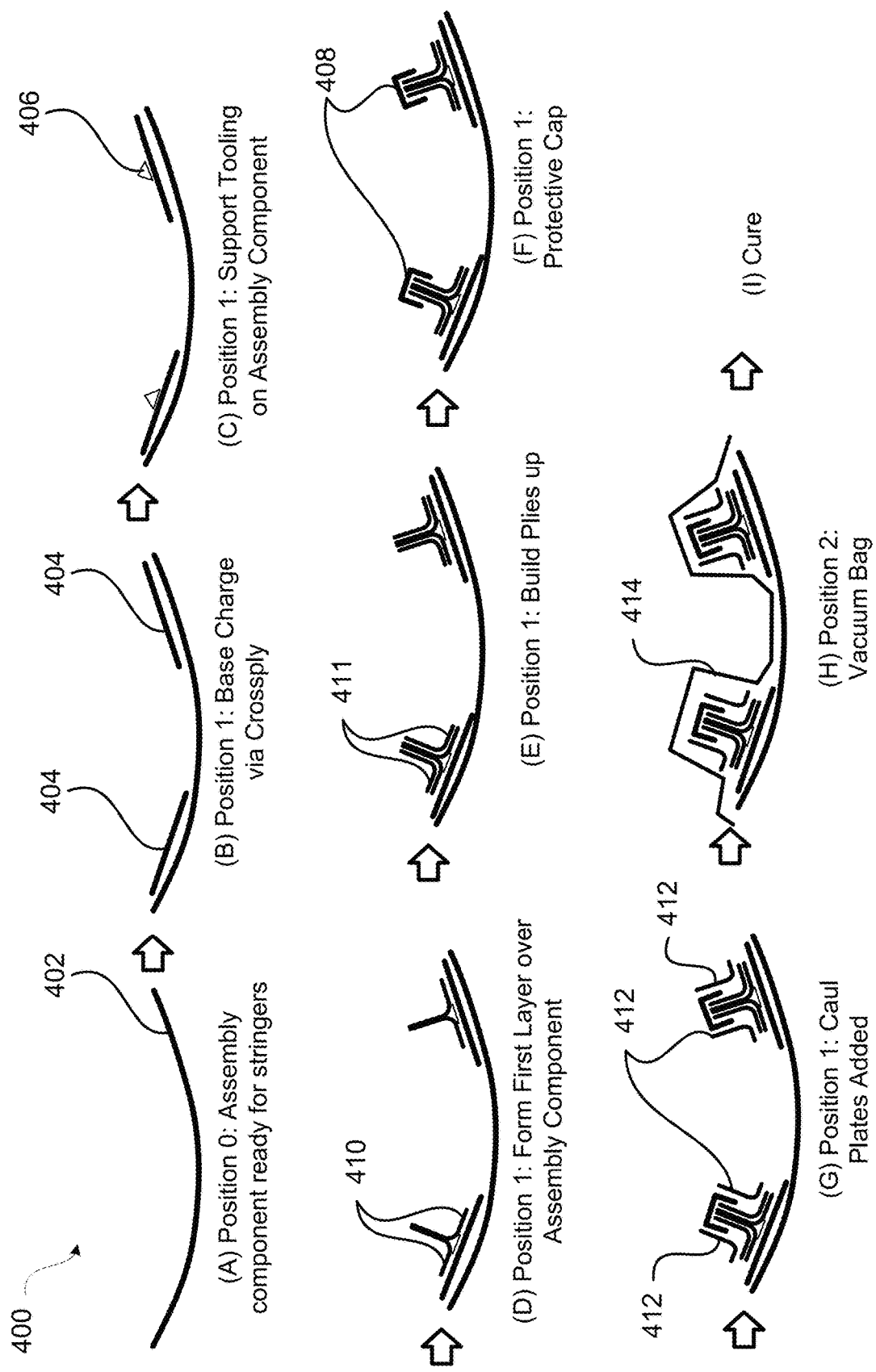
FIG. 4 illustrates an example process sequence for manufacturing minimally tooled stringers on a higher assembly component, in accordance with one or more embodiments.

FIG. 4 illustrates an example process sequence 400 for manufacturing minimally tooled stringers on a higher assembly component, in accordance with one or more embodiments. FIG. 4 depicts a cross-sectional view of an assembly component.

At step (A), a higher level assembly component 402 may be prepared and ready for stringers and other support structures. As previously described, a higher level assembly component may be a skin panel of an aircraft, as well as other structures, such as structures in horizontal and vertical stabilizers or control surfaces.

At step (B), base charges 404 may be positioned using cross ply rolls. In some embodiments, base charges 404 may comprise multiple layers of composite material. In some embodiments, base charges 404 may also be automatically deposited by a robotic end effector as described herein. In various embodiments base charges 404 form an even surface that is suitable for attachment of formed composite material.

At step (C), a support tool 406, such as a radius filler, mandrel, or bladder, may be positioned onto the base charge 404. Then, at step (D), first plies 410 of composite material may be formed using the end effectors assemblies described herein and positioned onto base charge 404 and support tool 406. As shown, a blade-shaped stringer, each comprising two sets of L-shaped stringer plies, are being deposited at step (C). Such blade-shaped stringer plies may be formed and deposited by the described end effector 301.

Second plies 411 of composite material may then be built up on the first plies 410 at step (E). In various embodiments, additional plies may be added to the plies shown in FIG. 4. A shown, the additional plies 411 are not joined together, but instead comprise separate L-shaped plies. Such plies 411 may be formed and deposited by a different end effector, such as 300. In some embodiments, the size of additional layers of composite material may be adjusted to fit on previously deposited layers. In some embodiments, the positioning of an end effector may also be automatically adjusted to the correct position to deposit additional formed plies.

At step (F), a protective cap 408 may be added to various locations of the deposited plies. For example, a protective cap 408 may be added to the tip of the blade-shaped stringer plies where the layers of composite material are exposed. In some embodiments, protective cap 408 may be used to protect against barely visible impact damage (BVID). In some embodiments, protective caps 408 may also be formed and deposited using systems and assemblies described herein.

At step (G), caul plates 412 may be placed in contact with one or more surfaces of the deposited layers. Caul plates 412 may be smooth metal plates, free of surface defects that are placed in contact with the deposited plies for the curing process. They may transmit normal pressure and temperature, and provide a smooth surface on the finished laminate. The formed layers 410 and 411, and/or the assembly component 402, may then be placed within a vacuum bag 414 for additional pressure to hold the composite layers in place for curing at step (I). In order for the pre-preg laminate to cure, it may be necessary to use a combination of pressure and heat.

Figure 5:
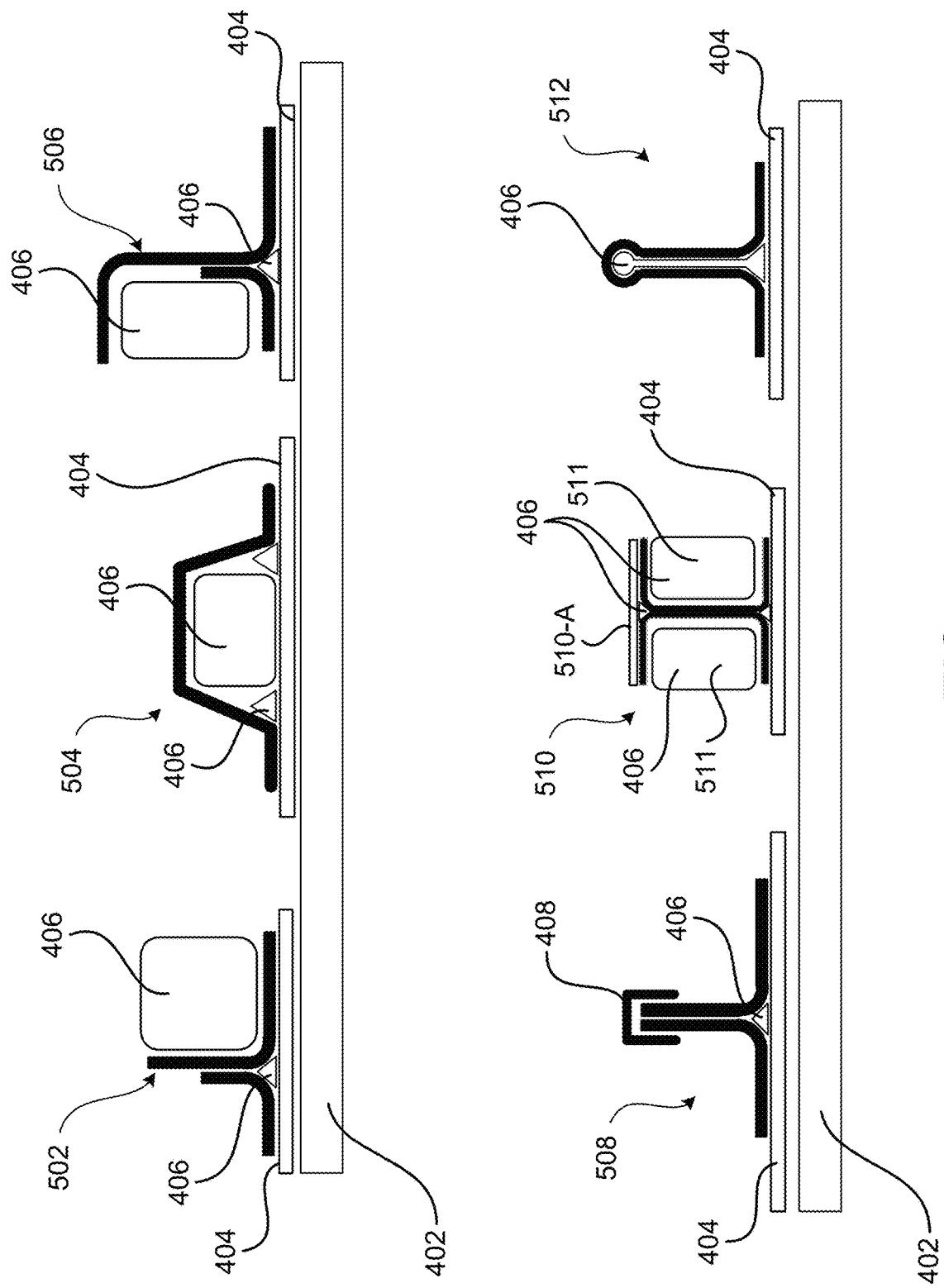
FIG. 5 illustrates cross-sectional views of various stringer types manufactured in accordance with one or more embodiments.

FIG. 5 illustrates cross-sectional views of various stringer types manufactured in accordance with one or more embodiments. As previously described with reference to FIG. 4, such stringers may be deposited onto a higher level assembly structure 402 and/or a base charge 404. Such stringers may also be positioned with one or more support tools 406. In some embodiments, the described systems and methods may also be implemented with IML (Inner Mold Line) permanent tooling.

Stringer 502 depicts an L-shape stringer. A smaller L-shaped stringer may also be deposited alongside stringer 502 and joined along their vertical legs for additional support. Stringer 504 depicts a variation of a hat-shaped stringer. Stringer 506 depicts a Z-shaped stringer. Here too, a smaller L-shaped stringer may also be deposited alongside stringer 506 and joined along their vertical legs for additional support. Stringer 508 depicts a blade-shaped stringer comprising two L-shaped stringers, similar to formed stringer 370. As previously described stringers may also include protective cap 408. Stringer 510 depicts an I-shaped stringer comprising two C-shaped stringers 511. The I-shaped stringer 510 may further include a top flat layer 510-A for additional support. Stringer 512 depicts another stringer shape which may include open or closed profile sections.

The compound stringer structures depicted that include two identical halves, such as blade-shaped stringer 508 or I-shaped stringer 510, may be deposited by an end effector configured with two spools and symmetrically arranged forming shoes, such as end effector 301. Such end effectors provide solutions to joining layers together to form compound stringers.

Method of Operation

Figure 6:
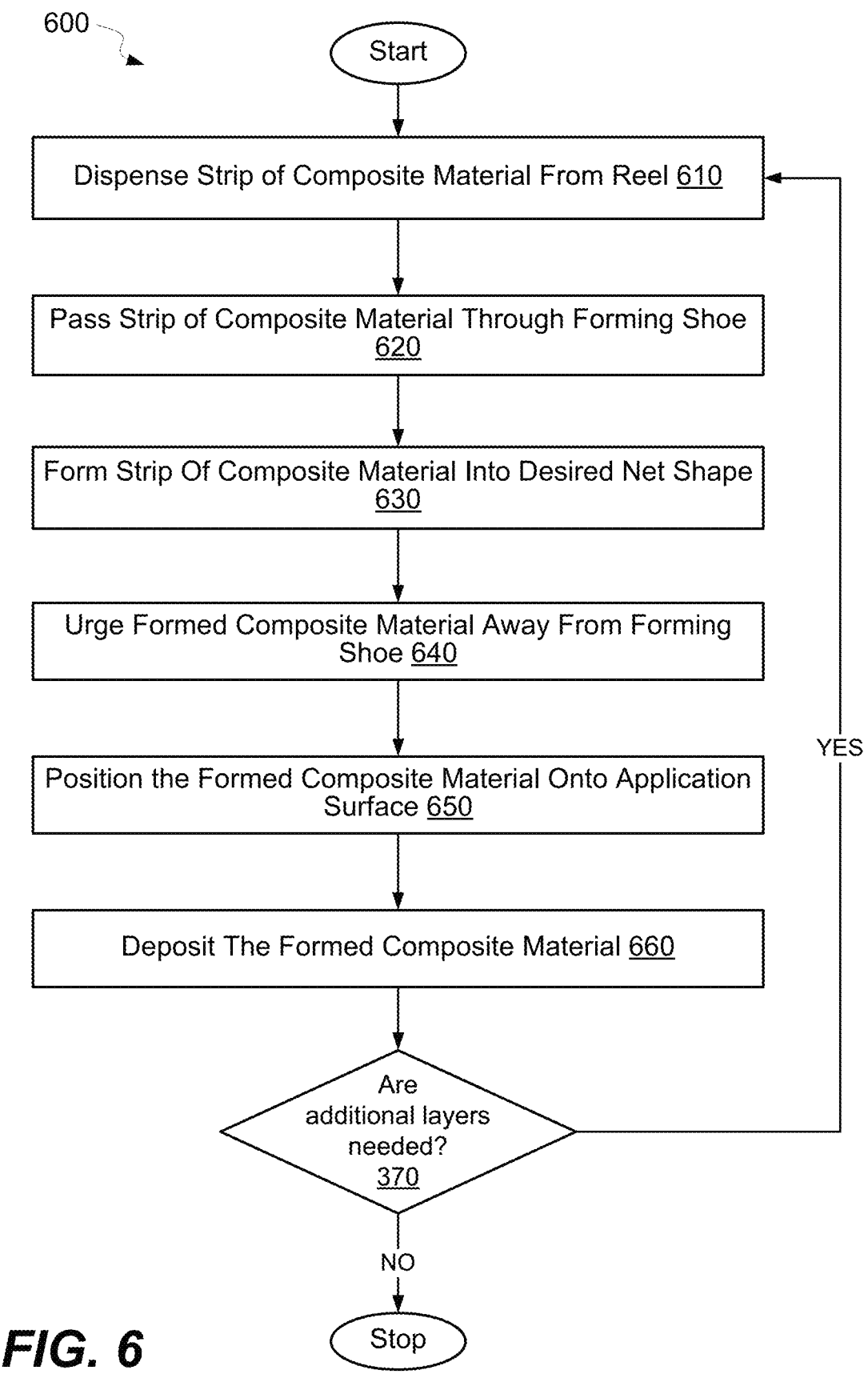
FIG. 6 illustrates an example method for manufacturing an aircraft stringer, in accordance with one or more embodiments.

Also provided are methods of manufacturing aircraft stringers using described systems and assemblies. With reference to FIG. 6, shown is an example method 600 for manufacturing an aircraft stringer, in accordance with one or more embodiments. In various embodiments, stringers may be formed and deposited by a robotic end effector for automatic placement of aircraft stringers with minimum tooling during manufacturing.

At step 610, a strip of composite material is dispensed from a reel. In various embodiments, composite material may be composite material 102 or 302. Such composite material may be wound about a reel, such as reel 110 or 310. The composite material may be dispensed by rotation of the reel such that it travels through various components of an end effector.

At step 620, the strip of composite material is passed through a forming shoe. In various embodiments, the forming shoe may be forming shoe 120 or 320. The material may contact the forming shoe at a start shape end and travel across a forming surface toward a final shape end to be formed into a stringer ply with a desired final shape at step 630. The start shape end of the forming shoe may be flat or substantially flat in shape to correspond to the shape of the composite material. The final shape end may include a configuration corresponding to the shape of a desired stringer.

The strip of composite material may be urged against the forming surface by suction mechanisms, or other mechanical mechanisms, such that it remains in contact with the forming surface. As the composite material passes over the forming surface toward the final shape end, the strip of composite material may transition from a substantially flat shape into the final desired net shape.

The formed composite material may be urged away from the forming shoe at step 640 and positioned onto an application surface at 650. As previously described, various compression mechanisms may be implemented to apply pressure onto the formed composite material, including compression disks, angled clamp jaws, etc. In some embodiments, the application surface may be a higher level assembly structure, such as 150, 350, or 402. Higher assembly structures may be a skin panel or a base charge. In some embodiments, a base charge may also be similarly deposited by an end effector as described herein. In some embodiments, a portion of the application surface may also include various support tooling, such as mandrels, noodles, or bladders, which function to maintain the shape of the formed material.

In some embodiments, the application surface may be the surface of another formed strip of composite material. For example, two strips of composite material may be simultaneously formed and urged together to form a single stringer ply with a final net shape after being released from the forming shoe.

The formed composite material may then be deposited on the application surface at step 660. In some embodiments, a cutting mechanism may separate the deposited material from the composite material remaining on the end effector. In some embodiments, deposited material may be cut after the various compression mechanisms. In some embodiments, the deposited material may be cut to be flush with the higher level assembly component.

At step 607, it may be determined whether additional layers are needed. If no additional layers are needed, then the method ends. If additional layer are needed, then the method returns to step 610 to dispense additional composite material to be formed and dispensed upon the previous deposited layer of composite material. The end effector may also adjust positioning to bring subsequent layers to the appropriate location to be deposited. In some embodiments, the end effector may use an imaging system to identify the appropriate position to deposit subsequent layers.

Additionally, in some embodiments, the size of the strip of composite material may be modified to conform to the application surface. For example, as additional L-shaped layers of composite material are deposited to form an L-shaped stringer, the surface area for subsequent L-shaped layers may decrease. Therefore, the strips of composite material for subsequent layers may need to be thinner.

Aircraft Examples

Figure 7:
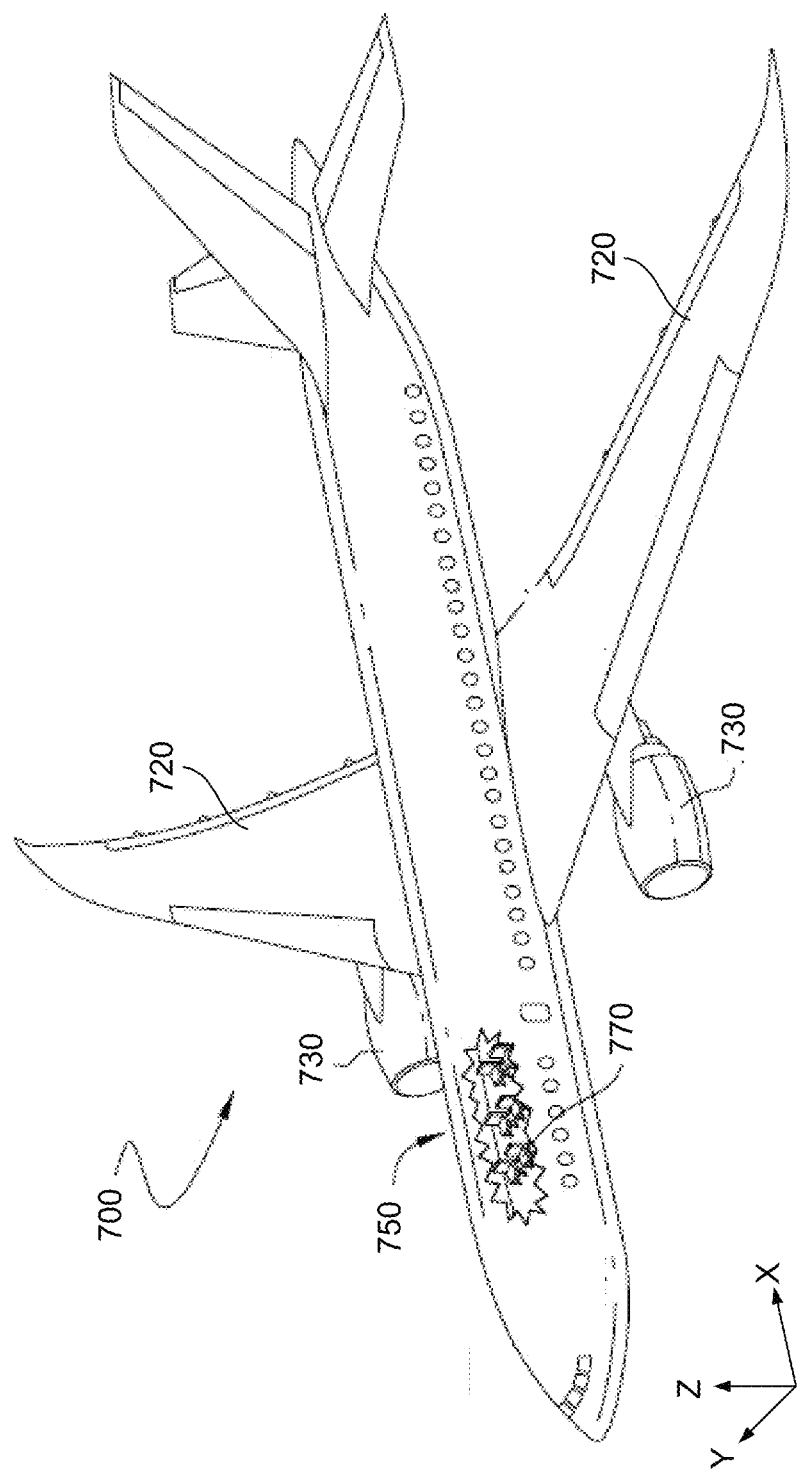
FIG. 7 is a schematic illustration of an aircraft that may include stiffened stringer panels manufactured using systems and assemblies described herein, in accordance with one or more embodiments.
Figure 8:
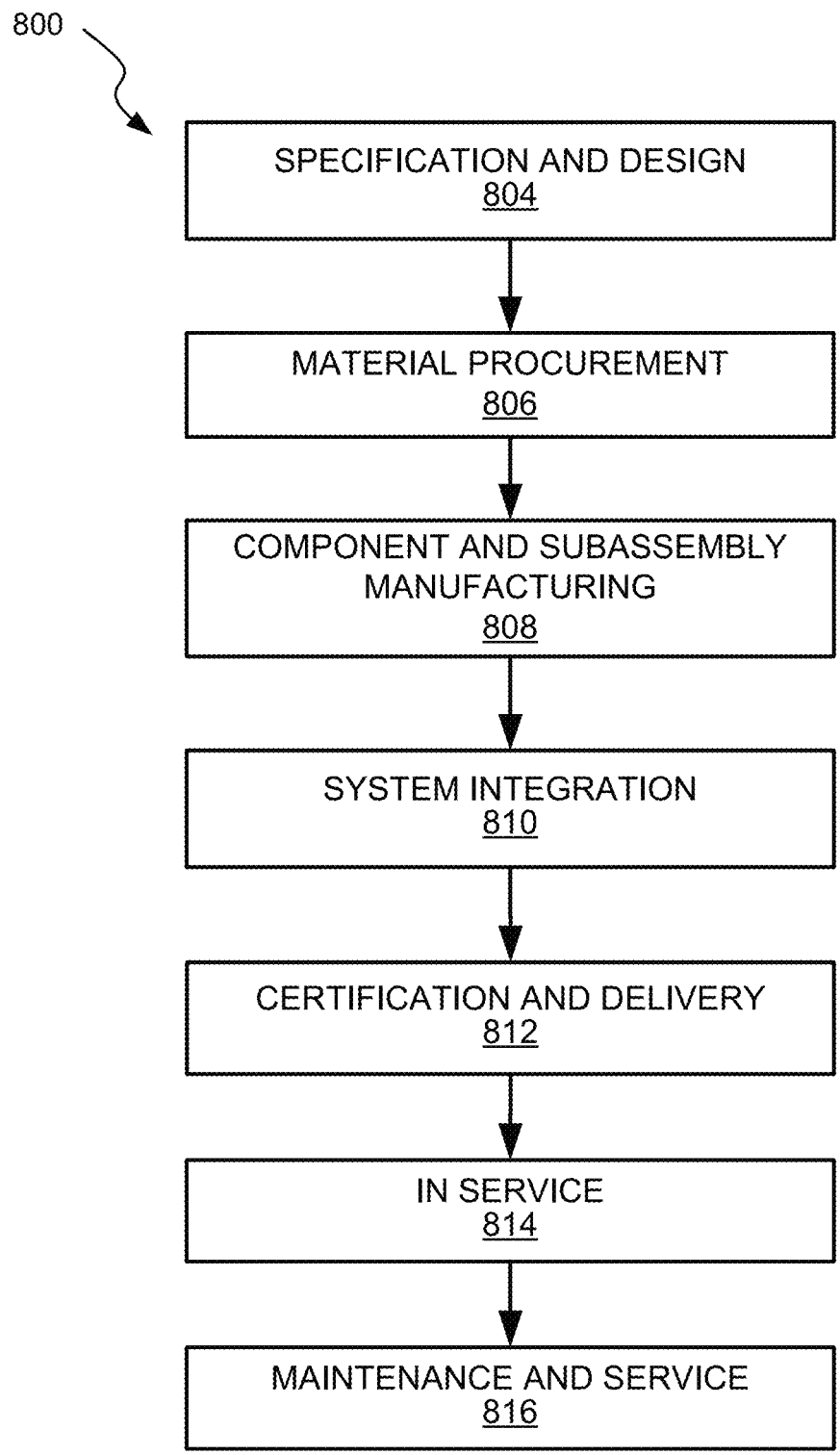
FIG. 8 is a block diagram of aircraft production and service methodology that may utilize methods and assemblies described herein.

Examples of the present disclosure may be described in the context of aircraft 700 as shown in FIG. 7 and aircraft manufacturing and service method 800 as shown in FIG. 8. FIG. 7 is a schematic illustration of an aircraft 700 that may include stiffened stringer panels manufactured using systems and assemblies described herein, in accordance with one or more embodiments. As depicted in FIG. 7, aircraft 700 comprises airframe 750 with interior 770. Aircraft 700 includes wings 720 coupled to airframe 750. Aircraft 700 may also include engines 730 supported by wings 720.

Aircraft 700 is one example of a vehicle in which the systems and methods described, such as end effector 100, may be implemented and operated, in accordance with an illustrative embodiment. Although an aerospace example is shown, the principles disclosed herein may be applied to other industries, such as the automotive industry. Accordingly, in addition to aircraft 700, the principles disclosed herein may apply to other vehicles, e.g., land vehicles, marine vehicles, space vehicles, etc.

FIG. 8 is a block diagram of aircraft production and service methodology that may utilize methods and assemblies described herein. During pre-production, illustrative method 800 may include specification and design (block 804) of aircraft 700 and material procurement (block 806). During production, component and subassembly manufacturing (block 808) and inspection system integration (block 810) of aircraft 700 may take place. Described apparatus, and corresponding methods of operation, may be implemented in any of specification and design (block 804) of aircraft 700, material procurement (block 806), component and subassembly manufacturing (block 808), and/or inspection system integration (block 810) of aircraft 700.

Thereafter, aircraft 700 may go through certification and delivery (block 812) to be placed in service (block 814). While in service, aircraft 700 may be scheduled for routine maintenance and service (block 816). Routine maintenance and service may include modification, reconfiguration, refurbishment, etc. of one or more inspection systems of aircraft 700. Described apparatus, and corresponding methods of operation, may be implemented in any of certification and delivery (block 812), service (block 814), and/or routine maintenance and service (block 816).

Each of the processes of illustrative method 800 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

CONCLUSION

Although the foregoing concepts have been described in some detail for purposes of clarity of understanding, after reading the above-disclosure it will be apparent that certain changes and modifications may be practiced within the scope of the appended claims. It should be noted that there are many alternative ways of implementing the processes, systems, and self-aligning riveting tools. Accordingly, the present examples are to be considered as illustrative and not restrictive.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

What is claimed is:

1. A robotic end effector comprising:
a forming shoe including a forming surface contacting a strip of material, wherein a first end of the forming surface corresponds to a first geometric profile that transitions to a second geometric profile corresponding to a second end of the forming surface, wherein the first geometric profile is different from the second geometric profile; and
a rotatable reel, wherein the strip of material is wound around the rotatable reel, wherein the rotatable reel is configured to dispense the strip of material to pass the strip of material along the forming surface from the first end to the second end such that the strip of material transitions from the first geometric profile to the second geometric profile and is deposited as a formed stringer ply onto an application surface.

2. The robotic end effector of claim 1, wherein the forming shoe further includes a set of rails extending from the forming surface to guide the strip of material between the first end and the second end of the forming surface.

3. The robotic end effector of claim 1, wherein the forming surface is configured with a plurality of ports along the forming surface, and wherein the forming shoe further includes a vacuum system to suction air through the plurality of ports to urge the strip of material against the forming surface.

4. The robotic end effector of claim 1, further comprising a compression mechanism for applying pressure to the formed stringer ply to position the formed stringer ply on the application surface.

5. The robotic end effector of claim 4, wherein the compression mechanism is further configured to join the formed stringer ply to one or more of the following: the application surface and another formed stringer ply.

6. The robotic end effector of claim 4, wherein the compression mechanism comprises a disk including a contact surface for contacting one or more portions of the formed stringer ply.

7. The robotic end effector of claim 1, further comprising a collection spool, wherein the strip of material includes a backing substrate which is separated from the strip of material and collected around the collection spool as the strip of material is dispensed from the rotatable reel.

8. The robotic end effector of claim 7,
wherein the backing substrate includes a plurality of perforations, wherein the plurality of perforations are evenly spaced along a length of the backing substrate, and
wherein the collection spool comprises a plurality of protrusions configured to interface with the plurality of perforations for collecting the backing substrate as the strip of material is dispensed from the rotatable reel.

9. The robotic end effector of claim 1, wherein the second geometric profile is an "L" shape.

10. The robotic end effector of claim 1, wherein the second geometric profile is a hat-shape.

11. A system comprising:
a robotic arm; and
an end effector coupled to the robotic arm, the end effector comprising:
a forming shoe including a forming surface contacting a strip of material, wherein a first end of the forming surface corresponds to a first geometric profile that transitions to a second geometric profile corresponding to a second end of the forming surface, wherein the first geometric profile is different from the second geometric profile; and
a rotatable reel, wherein the strip of material is wound around the rotatable reel, wherein the rotatable reel is configured to dispense the strip of material to pass the strip of material along the forming surface from the first end to the second end such that the strip of material transitions from the first geometric profile to the second geometric profile and is deposited as a formed stringer ply onto an application surface.

12. The system of claim 11, wherein the forming shoe further includes a set of rails extending from the forming surface to guide the strip of material between the first end and the second end of the forming surface.

13. The system of claim 11, wherein the forming surface is configured with a plurality of ports along the forming surface, and wherein the forming shoe further includes a vacuum system to suction air through the plurality of ports to urge the strip of material against the forming surface.

14. The system of claim 11, wherein the end effector further comprises a compression mechanism for applying pressure to the formed stringer ply to position the formed stringer ply on the application surface.

15. The system of claim 14, wherein the compression mechanism is further configured to join the formed stringer ply to one or more of the following: the application surface and another formed stringer ply.

16. The system of claim 14, wherein the compression mechanism comprises an angled clamping jaw.

17. The system of claim 11, wherein the end effector further comprises a collection spool, wherein the strip of material includes a backing substrate which is separated from the strip of material and collected around the collection spool as the strip of material is dispensed from the rotatable reel.

18. The system of claim 17,
wherein the backing substrate includes a plurality of perforations, wherein the plurality of perforations are evenly spaced along a length of the backing substrate, and
wherein the collection spool comprises a plurality of protrusions configured to interface with the plurality of perforations for collecting the backing substrate as the strip of material is dispensed from the rotatable reel.

19. A method of constructing aircraft stiffeners, the method comprising:
dispensing a strip of material from a rotatable reel to a forming shoe, the forming shoe including a forming surface contacting the strip of material, wherein a first end of the forming surface corresponds to a first geometric profile that transitions to a second geometric profile corresponding to a second end of the forming surface, wherein the first geometric profile is different from the second geometric profile; and
passing the strip of material along the forming surface from the first end to the second end as the strip of material is dispensed from the rotatable reel such that the strip of material transitions from the first geometric profile to the second geometric profile into a formed stringer ply; and
depositing the formed stringer ply onto an application surface.

20. The method of claim 19 further comprising:
urging the formed stringer ply away from the second end of the forming surface; and
positioning the formed stringer ply relative to the application surface.

* * * * *